(12) United States Patent
Carroll et al.

(10) Patent No.: US 9,936,456 B1
(45) Date of Patent: Apr. 3, 2018

(54) POWER CONSUMPTION MANAGEMENT BASED ON ENABLING AND DISABLING WIRELESS CHAINS

(71) Applicant: ARRIS Enterprises LLC, Suwanee, GA (US)

(72) Inventors: Brian M. Carroll, Quakertown, PA (US); Clyde Robbins, Fort Washington, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/471,293

(22) Filed: Mar. 28, 2017

(51) Int. Cl.
*H04W 52/02* (2009.01)
*H04W 84/12* (2009.01)

(52) U.S. Cl.
CPC ........ *H04W 52/0251* (2013.01); *H04W 84/12* (2013.01)

(58) Field of Classification Search
CPC . H04W 52/0251; H04W 24/02; H04W 88/06; H04W 52/028; H04W 88/02; H04W 84/12
USPC .......... 455/522, 69, 68, 552.1, 553.1, 550.1, 455/500, 517, 575.1, 67.11, 343.1–345.6, 455/572, 574; 370/310, 311, 252, 329, 370/328, 338
See application file for complete search history.

(56) References Cited

U.S. PATENT DOCUMENTS

| | | | |
|---|---|---|---|
| 2014/0301214 A1* | 10/2014 | Zhang ................... | H04W 36/18 370/252 |
| 2015/0349836 A1* | 12/2015 | Ponukumati ........... | H04B 1/401 455/553.1 |
| 2016/0360489 A1* | 12/2016 | Boodannavar ....... | H04B 7/0413 |

* cited by examiner

Primary Examiner — Keith Ferguson
(74) Attorney, Agent, or Firm — Bart A. Perkins (57) ABSTRACT

Methods, systems, and computer readable media can be operable to facilitate power consumption management of a station by enabling and disabling wireless chains. A station may determine minimal QoS requirements for supporting a WLAN service at the station. The station may determine and utilize a minimal number of WLAN chains needed to support the WLAN service while meeting the minimal QoS requirements. In embodiments, an internal temperature of the station may be monitored, and when the internal temperature of the station exceeds a temperature threshold, one or more WLAN chains of the station may be disabled to reduce power consumption by the station.

20 Claims, 5 Drawing Sheets

POWER CONSUMPTION MANAGEMENT BASED ON ENABLING AND DISABLING WIRELESS CHAINS

TECHNICAL FIELD

This disclosure relates to managing power consumption of a device by enabling and disabling wireless chains.

BACKGROUND

One or more access points located within a subscriber premise may provide wireless communications and/or services to one or more stations configured to communicate with the one or more access points. Stations may include WLAN (wireless local area network) systems configured to transmit and receive wireless communications from an access point or other wireless device. The WLAN systems may include a plurality of antennas, wherein each of the antennas may include a receiver and/or transmitter for facilitating the receiving and/or transmitting of wireless communications over a wireless communication medium. Each of the antennas may include a separate low noise amplifier (LNA) and programmable amplifier (PA). With multiple antennas, a station may be configured to communicate over a plurality of spatial streams by utilizing a plurality of transmit and receive chains. The multiple transmit and receive chains in the device, along with the processing of multiple WLAN streams can be a significant source of power draw in a station. For many stations, specifically small form factor clients, this may be a significant burden on the overall system power dissipation, resulting in poor performance and potential thermal problems. Even while a station is operating in receive only mode, the LNA devices may have a significant power draw for a small low power device.

WLAN streams may be configured in multiple configurations. For example, each stream may include an independent part of a bit stream, or multiple streams may contain the same information leading to a beam forming effect on the resulting RF (radio frequency) signals. Each active stream may have an associated power draw, thus the more streams active, the higher the overall system power draw. Therefore, it is desirable to improve upon methods and systems for managing power draw at a station related to a number of active WLAN streams.

BRIEF DESCRIPTION OF THE DRAWINGS

Like reference numbers and designations in the various drawings indicate like elements.

DETAILED DESCRIPTION

Methods, systems, and computer readable media can be operable to facilitate power consumption management of a station by enabling and disabling wireless chains. A station may determine minimal QoS requirements for supporting a WLAN service at the station. The station may determine and utilize a minimal number of WLAN chains needed to support the WLAN service while meeting the minimal QoS requirements. In embodiments, an internal temperature of the station may be monitored, and when the internal temperature of the station exceeds a temperature threshold, one or more WLAN chains of the station may be disabled to reduce power consumption by the station.

An embodiment of the invention described herein may include a method comprising: (a) initializing a wireless service at a station, wherein a plurality of wireless chains are enabled at the station for supporting the wireless service; (b) determining one or more requirements for supporting the wireless service; (c) determining an internal temperature of the station; (d) comparing the internal temperature of the station to a temperature threshold; and (e) if the internal temperature of the station is greater than the temperature threshold, disabling one or more of the plurality of wireless chains such that a reduced number of wireless chains are enabled at the station for supporting the wireless service.

According to an embodiment of the invention, the method described herein further comprises: (a) determining whether the one or more requirements for supporting the wireless service are met by the reduced number of wireless chains enabled at the station; and (b) if the one or more requirements for supporting the wireless service are not met by the reduced number of wireless chains enabled at the station, enabling one or more disabled wireless chains at the station.

According to an embodiment of the invention, the one or more requirements for supporting the wireless service comprise a bitrate having a sufficient margin over a minimal bitrate required for supporting the wireless service.

According to an embodiment of the invention, the one or more requirements for supporting the wireless service comprise one or more quality of service requirements.

According to an embodiment of the invention, each respective one of the plurality of wireless chains comprises an antenna.

According to an embodiment of the invention, each respective one of the plurality of wireless chains comprises a receiver and a transmitter.

According to an embodiment of the invention, the number of disabled wireless chains is determined based upon a difference between the internal temperature of the station and the temperature threshold.

An embodiment of the invention described herein may include a device comprising: (a) a plurality of wireless chains, wherein one or more of the plurality of wireless chains are enabled to support a wireless service; and (b) one or more modules configured to: (i) determine one or more requirements for supporting the wireless service; (ii) determine an internal temperature of the station; (iii) compare the internal temperature of the station to a temperature threshold; and (iv) if the internal temperature of the station is greater than the temperature threshold, disable one or more of the plurality of wireless chains such that a reduced number of wireless chains are enabled for supporting the wireless service.

According to an embodiment of the invention, the one or more modules are further configured to: (a) determine whether the one or more requirements for supporting the wireless service are met by the reduced number of enabled wireless chains; and (b) if the one or more requirements for supporting the wireless service are not met by the reduced number of enabled wireless chains, enable one or more of the plurality of disabled wireless chains.

An embodiment of the invention described herein may include one or more non-transitory computer readable media having instructions operable to cause one or more processors to perform the operations comprising: (a) initializing a wireless service at a station, wherein a plurality of wireless chains are enabled at the station for supporting the wireless service; (b) determining one or more requirements for supporting the wireless service; (c) determining an internal temperature of the station; (d) comparing the internal temperature of the station to a temperature threshold; and (e) if the internal temperature of the station is greater than the temperature threshold, disabling one or more of the plurality of wireless chains such that a reduced number of wireless chains are enabled at the station for supporting the wireless service.

According to an embodiment of the invention, the instructions are further operable to cause the one or more processors to perform the operations comprising: (a) determining whether the one or more requirements for supporting the wireless service are met by the reduced number of wireless chains enabled at the station; and (b) if the one or more requirements for supporting the wireless service are not met by the reduced number of wireless chains enabled at the station, enabling one or more disabled wireless chains at the station.

Figure 1:
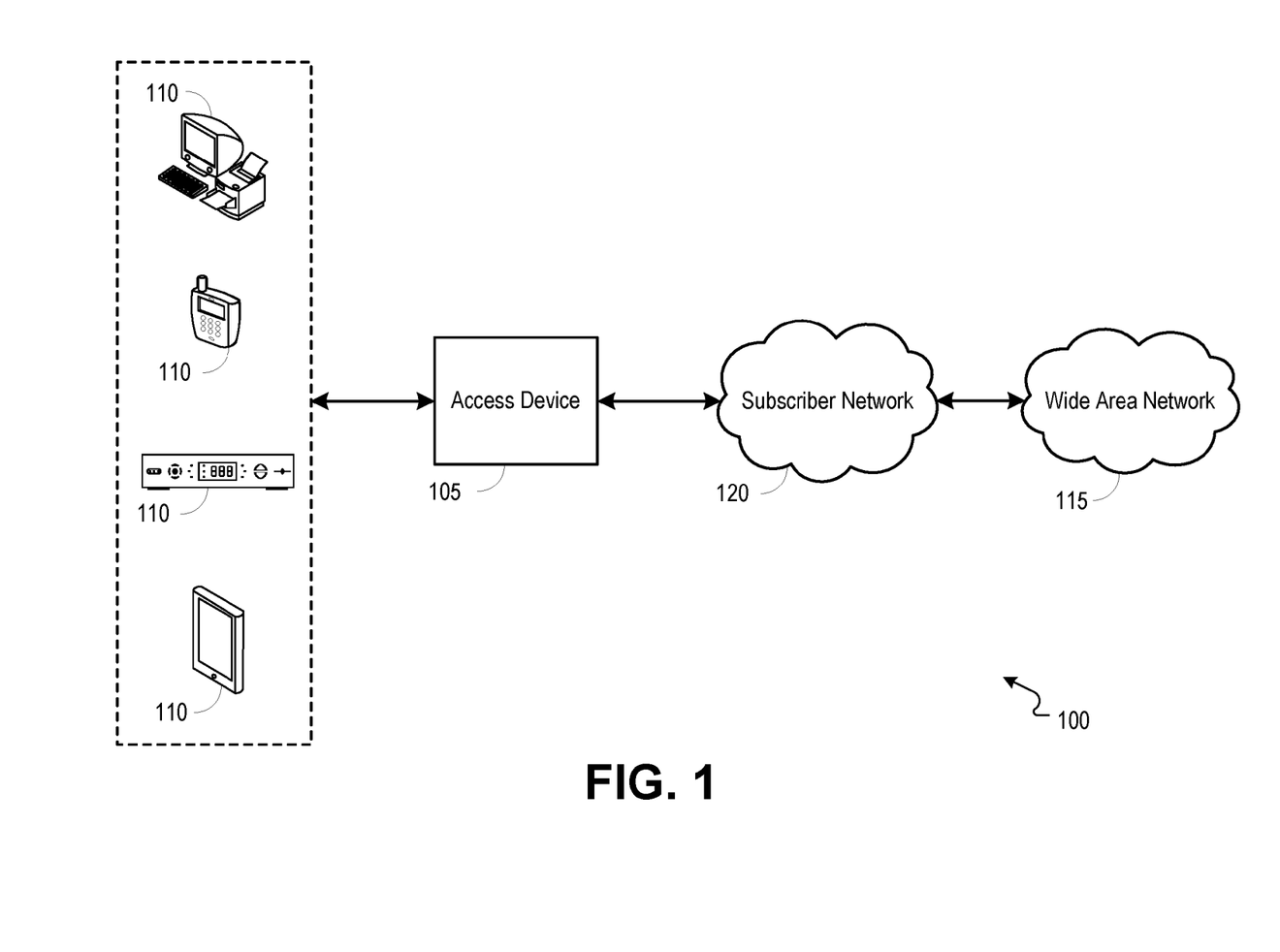
FIG. 1 is a block diagram illustrating an example network environment operable to facilitate power consumption management of a station by enabling and disabling wireless chains.

FIG. 1 is a block diagram illustrating an example network environment 100 operable to facilitate power consumption management of a station by enabling and disabling wireless chains. In embodiments, an access device 105 can route communications to and from one or more stations 110. For example, the one or more stations 110 can be provisioned to receive video service(s), data service(s), voice service(s), home security service(s), and/or other services through one or more access devices 105. In embodiments, an access device 105 may include a gateway, a cable modem, a wireless router including an embedded cable modem, a mobile hot-spot router, a multimedia over coaxial alliance (MoCA) node, a wireless extender, and any access point or other device that is operable to route communications to and from a station 110.

In embodiments, stations 110 may include a wide variety of devices such as televisions, mobile devices, tablets, set-top boxes, computers, telephones, security devices, and any other device that is capable of utilizing a wireless video, data, telephony, or security service, or that is otherwise capable of transmitting and/or receiving wireless communications. Stations 110 may include device components or modules (e.g., wireless form factors) that are configured to facilitate the passing of wireless communications between a host device (e.g., the device to which the component or module is attached) and an access device 105.

In embodiments, an access device 105 may route communications between stations 110 and a WAN 115 via a subscriber network 120. The subscriber network 120 may include various networks such as Ethernet (e.g., CAT5/CAT6), coaxial cable, optical fiber, twisted pair network, satellite networks, mobile networks including 4G and LTE, and others.

In embodiments, an access device 105 may be configured to provide, and a station 110 may be configured to receive, a plurality of WLAN streams. WLAN streams may be configured in multiple configurations. For example, each stream may include an independent part of a bit stream, or multiple streams may contain the same information leading to a beam forming effect on the resulting RF (radio frequency) signals. Each active stream may have an associated power draw, thus the more streams active, the higher the overall power draw on the WLAN system of the station 110. However, the WLAN system may or may not need the added performance gained by using more streams to meet a certain required level of quality of service (QoS) for a current task at hand. In embodiments, the station 110 may be configured to reduce WLAN performance requirements, and one or more active WLAN streams/chains, if a condition occurs where the internal temperature of the station 110 reaches a temperature that is greater than a predetermined threshold. By disabling unnecessary WLAN transmit and/or receive chains, including hardware components associated with the chains, the station 110 may reduce the amount of power drawn by the station 110.

In embodiments, a station 110 may include one or more radio antennas, or other interface module configured to transmit and/or receive wireless communications. The station 110 may include a plurality of radio antennas, or other interface, thereby allowing the station 110 to receive and/or transmit wireless communications associated with multiple wireless streams.

In embodiments, a station 110 may be configured to determine a minimal QoS requirement for a current service or task and may adjust a number of operating or active antennas according to the minimal QoS requirement. For example, the station 110 may be configured to minimize power dissipation of a WLAN system of the station 110 by enabling only those transmit and/or receive chains necessary to maintain a minimal QoS requirement for a current service or task. The station 110 may determine a desired bitrate having a sufficient margin over a minimal bitrate required for carrying out a current service or task at the station 110, and the station 110 may remove power from, or otherwise disable, a number of chains such that the number of operational chains is the minimal number of chains required to provide the desired bitrate. The transmit and/or receive chains of a WLAN system may include any external WLAN modules (e.g., LNA, PA, FEM (front-end modules), etc.) as well as internal baseband processing that may be included in a WLAN system on chip (SOC).

In embodiments, the minimal QoS requirement for a station 110 may be determined based upon a type of service provided by or received at the station 110. The station 110 may be configured to provide certain minimal QoS requirements for specific services provided by or received at the station 110. For example, minimal QoS requirements for an IoT (Internet of things) device or a station 110 providing an IoT service may include a minimal fixed bitrate (i.e., due to the static nature of data transmission/reception size), whereas minimal QoS requirements for a station 110 providing video services may include a large buffer between a minimal required bitrate and supported bitrate due to the dynamic nature of video data transmission/reception sizes.

In embodiments, a station 110 may be configured to disable one or more WLAN chains when the internal temperature of the station 110 exceeds a temperature threshold. For example, the station 110 may disable one or more WLAN chains until the internal temperature of the station 110 returns below the temperature threshold.

In embodiments, a station 110 may be configured to determine an optimal QoS or bitrate needed for a current service or task based upon a measured internal temperature of the station 110. For example, when the internal temperature of the station 110 reaches or exceeds a predetermined threshold, the station 110 may disable one or more WLAN transmit and/or receive chains. The station 110 may determine a specific number of WLAN transmit and/or receive chains for disabling based upon a minimal reduction in QoS or bitrate for supporting a current service or task to the station 110. For example, the station 110 may disable a minimal number of WLAN transmit and/or receive chains until the internal temperature of the station 110 drops below the predetermined threshold temperature.

In embodiments, after a change occurs in the number of enabled WLAN chains at a station 110, the station 110 may communicate the change to an associated access device 105. For example, after one or more WLAN chains are enabled or disabled at a station 110, the station 110 may output a communication to the access device 105, wherein the communication informs the access device 105 of the enabled WLAN chains so that the access device 105 may update one or more configuration settings to enable communication with the station 110 according to the updated number of enabled WLAN chains.

It should be understood that the number of enabled transmitters at a station 110 may differ from the number of enabled receivers at the station 110. For example, the size of upstream traffic output by the station 110 may differ from the size of downstream traffic received at the station 110, thus the station 110 may enable and/or disable WLAN transmitters and/or receivers individually based upon upstream and downstream traffic demands at the station 110.

Figure 2:
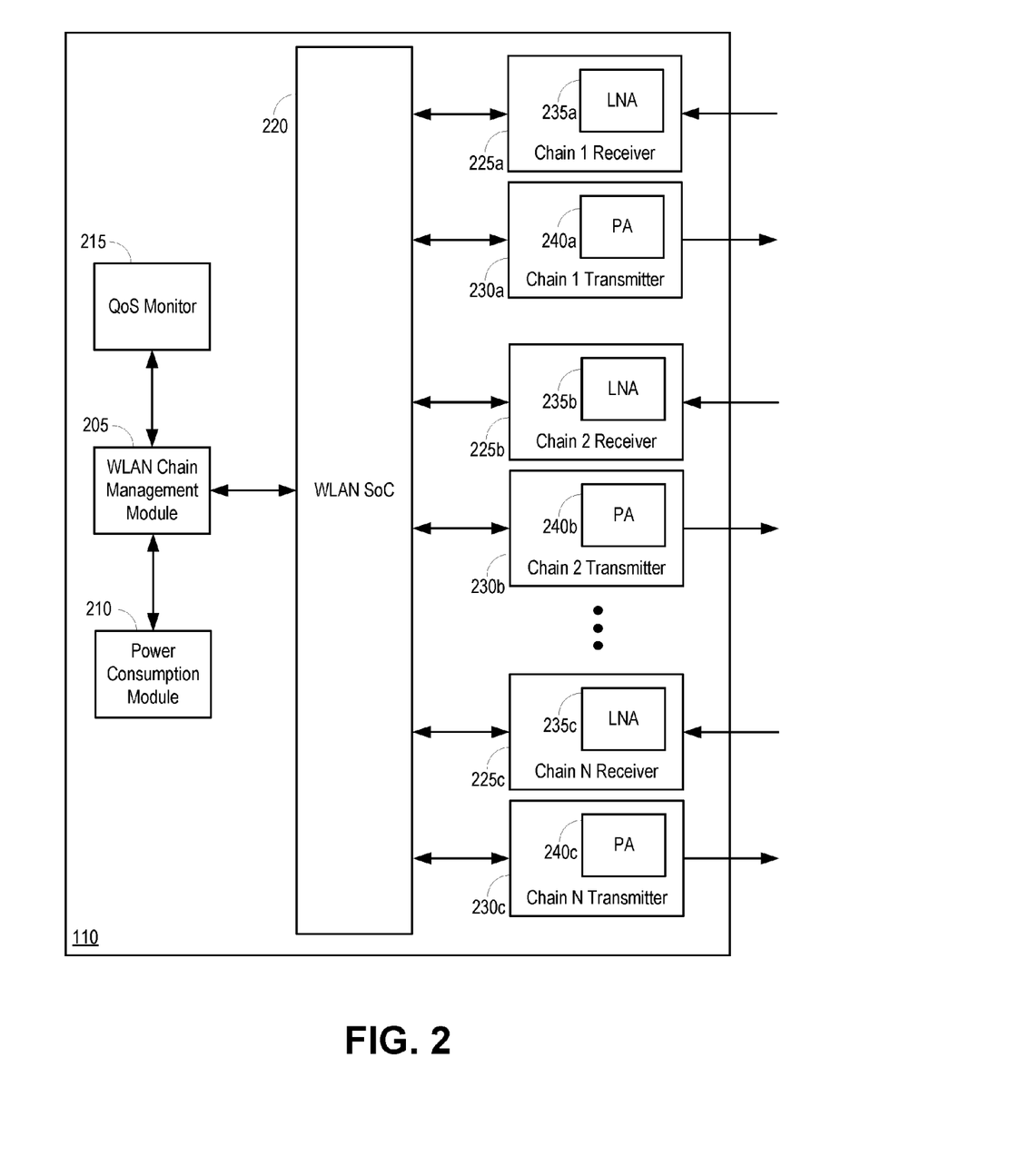
FIG. 2 is a block diagram illustrating an example station operable to facilitate power consumption management of a station by enabling and disabling wireless chains.

FIG. 2 is a block diagram illustrating an example station 110 operable to facilitate power consumption management of a station by enabling and disabling wireless chains. The station 110 may include a WLAN chain management module 205, a power consumption module 210, a QoS monitor 215, a WLAN SoC 220, and one or more WLAN chains, wherein each WLAN chain comprises a receiver 225a-c and a transmitter 230a-c. Each receiver 225a-c may be configured to receive wireless communications (e.g., 802.11 communications) from an access point (e.g., access device 105 of FIG. 1) or other station 110, and each receiver 225a-c may include one or more components utilized in the reception of wireless communications at the station 110 (e.g., LNA 235a-c, etc.). Each transmitter 230a-c may be configured to output wireless communications (e.g., 802.11 communications), and each transmitter 230a-c may include one or more components utilized in the transmission of wireless communications from the station 110 (e.g., PA 240a-c, etc.). In embodiments, each WLAN chain may be configured to receive and/or transmit a WLAN stream. WLAN streams may be configured in multiple configurations. For example, each stream may include an independent part of a bit stream, or multiple streams may contain the same information leading to a beam forming effect on the resulting RF (radio frequency) signals.

In embodiments, the WLAN chain management module 205 may be configured to reduce WLAN performance requirements, and one or more active WLAN streams/chains, if a condition occurs where the internal temperature of the station 110 reaches a temperature that is greater than a predetermined threshold. By disabling unnecessary WLAN transmit and/or receive chains, including hardware components associated with the chains, the WLAN chain management module 205 may reduce the amount of power drawn by the station 110.

In embodiments, a QoS monitor 215 may be configured to determine a minimal QoS requirement for a current service or task and may adjust a number of operating or active WLAN chains according to the minimal QoS requirement. For example, the WLAN chain management module 205 may be configured to minimize power dissipation of a WLAN system of the station 110 by enabling only those receivers 225a-c and transmitters 230a-c necessary to maintain a minimal QoS requirement for a current service or task. The QoS monitor 215 may determine a desired bitrate as a bitrate having a sufficient margin over a minimal bitrate required for carrying out a current service or task at the station 110, and the WLAN chain management module 205 may cause the WLAN SoC to remove power from, or otherwise disable, a number of WLAN chains such that the number of operational WLAN chains is the minimal number of WLAN chains required to provide the desired bitrate. While only LNAs 235a-c and PAs 240a-c are shown, it should be understood that transmit and/or receive chains of a WLAN system may include various other external WLAN modules (e.g., FEM (front-end modules), etc.) as well as internal baseband processing that may be included in a WLAN SOC 220.

In embodiments, a power consumption module 210 may monitor the internal temperature of the station 110. For example, the power consumption module 210 may monitor the internal temperature of the station 110 by way of monitoring chip temperatures, the internal ambient temperature of the station 110, or by measuring the temperature of other regions or components of the station 110. In embodiments, when the power consumption module 210 determines that the internal temperature of the station 110 has exceeded a temperature threshold, the WLAN chain management module 205 may disable one or more of the WLAN chains (e.g., one or more of the receivers 225a-c and/or transmitters 230a-c). The WLAN chain management module 205 may disable one or more WLAN chains until the power consumption module 210 determines that the internal temperature of the station 110 returns below the temperature threshold.

In embodiments, the QoS monitor 215 may be configured to determine an optimal QoS or bitrate needed for a current service or task based upon a measured internal temperature of the station 110. For example, when the power consumption module 210 determines that the internal temperature of the station 110 reaches or exceeds a temperature threshold, the WLAN chain management module 205 may disable one or more WLAN transmit and/or receive chains. The WLAN chain management module 205 may determine a specific number of WLAN transmit and/or receive chains for disabling based upon a minimal reduction in QoS or bitrate for supporting a current service or task to the station 110, wherein the minimal reduction in QoS or bitrate is determined by the QoS monitor 215. For example, the WLAN chain management module 205 may disable a minimal number of WLAN transmit and/or receive chains until the internal temperature of the station 110 drops below the threshold temperature.

Figure 3:
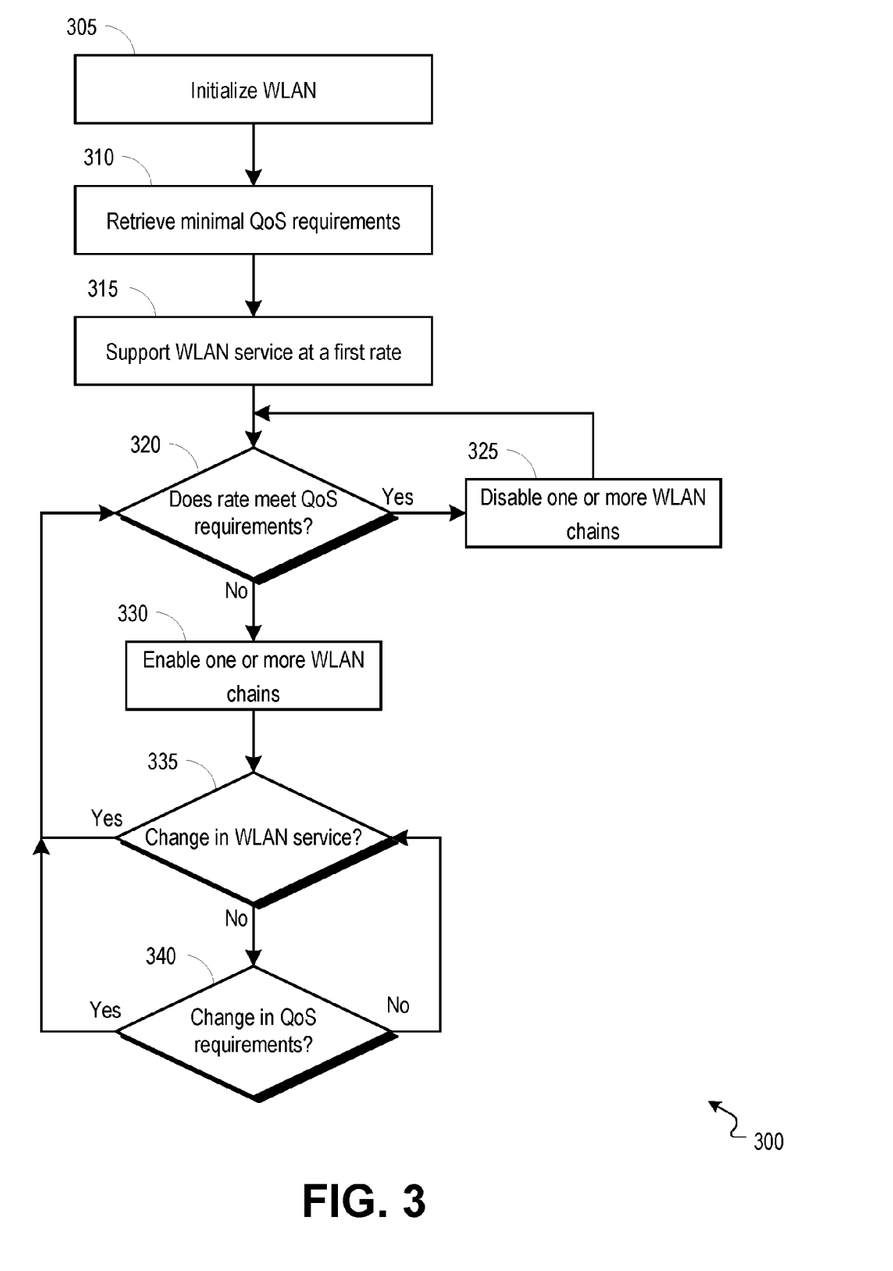
FIG. 3 is a flowchart illustrating an example process operable to determine and utilize a minimal number of WLAN chains to meet QoS requirements.

FIG. 3 is a flowchart illustrating an example process 300 operable to determine and utilize a minimal number of WLAN chains to meet QoS requirements. In embodiments, the process 300 may be carried out by a station 110 of FIG. 1. The process 300 may start at 305, when a WLAN service is initialized at a station 110. A WLAN service may be initialized at a station 110 when a wireless stream is requested by or received at the station 110. For example, a WLAN service may be initialized by a WLAN SoC 220 of FIG. 2.

At 310, minimal QoS requirements for the WLAN service may be retrieved. Minimal QoS requirements for the WLAN service may be retrieved or determined, for example, by the QoS monitor 215 of FIG. 2. In embodiments, the minimal QoS requirements may include minimal QoS metrics needed for supporting the WLAN service, or the minimal QoS requirements may include a minimal bitrate needed for supporting the WLAN service or a determined bitrate having a certain margin above a minimal bitrate needed for supporting the WLAN service.

At 315, the WLAN service may be supported at a first bitrate. The WLAN service may be supported, for example, by the WLAN SoC 220 and one or more WLAN chains. Each of the one or more WLAN chains may include a receiver (e.g., receivers 225a-c) and/or transmitter (e.g., transmitters 230a-c). In embodiments, each WLAN chain enabled at the station 110 may provide a certain bitrate for supporting one or more WLAN services. The first bitrate may be based upon the number of WLAN chains enabled at the station 110. For example, based upon a default setting or the minimal QoS requirements for the WLAN service, the station 110 may enable a certain number of one or more WLAN chains to support the WLAN service.

At 320, a determination may be made whether the bitrate supported by the station 110 (e.g., the first bitrate or subsequently adjusted bitrate) meets the minimal QoS requirements for the WLAN service. The determination whether the bitrate supported by the station 110 meets the minimal QoS requirements may be made, for example, by the QoS monitor 215 of FIG. 2 or other component or module of the station 110. The supported bitrate may be based upon the number of enabled WLAN chains at the station 110, and the supported bitrate may be compared to the minimal QoS requirements for the WLAN service. In embodiments, other QoS metrics supported by the current bitrate may be determined (e.g., by the QoS monitor 215), and the QoS metrics may be compared to the minimal QoS requirements to determine whether the minimal QoS requirements are met by the current bitrate supported by the station 110.

If, at 320, the determination is made that the bitrate supported by the station 110 does meet the minimal QoS requirements for the WLAN service, the process 300 may proceed to 325. At 325, one or more WLAN chains may be disabled. One or more WLAN chains may be disabled, for example, by the WLAN chain management module 205 of FIG. 2 through the WLAN SoC 220 of FIG. 2. In embodiments, the WLAN chain management module 205 may disable a single WLAN chain or multiple WLAN chains of the station 110. For example, the WLAN chain management module 205 may determine a number of WLAN chains to be disabled based upon a difference between the QoS or bitrate currently supported by the station 110 and the minimal QoS requirements needed by the WLAN service. One or more WLAN chains may be disabled, for example, by disabling one or more receivers (e.g., receivers 225a-c of FIG. 2) and/or transmitters (e.g., transmitters 230a-c of FIG. 2) of the station 110. For example, a receiver may be disabled by disabling one or more components of the receiver (e.g., LNA 235a-c of FIG. 2, etc.), and a transmitter may be disabled by disabling one or more components of the transmitter (e.g., PA 240a-c of FIG. 2, etc.). The updated number of enabled WLAN chains may be communicated to an associated access point (e.g., access device 105 of FIG. 1). After disabling the one or more WLAN chains, the process 300 may return to 320 where the determination may be made whether the current bitrate provided by the station 110 meets the minimal QoS requirements for the WLAN service.

If, at 320, the determination is made that the bitrate supported by the station 110 does not meet the minimal QoS requirements for the WLAN service, the process 300 may proceed to 330. At 330, one or more WLAN chains may be enabled. One or more WLAN chains may be enabled, for example, by the WLAN chain management module 205 of FIG. 2 through the WLAN SoC 220 of FIG. 2. In embodiments, the WLAN chain management module 205 may enable a single WLAN chain or multiple WLAN chains of the station 110. For example, the WLAN chain management module 205 may determine a number of WLAN chains to be enabled based upon a difference between the QoS or bitrate currently supported by the station 110 and the minimal QoS requirements needed by the WLAN service. One or more WLAN chains may be enabled, for example, by enabling one or more receivers (e.g., receivers 225a-c of FIG. 2) and/or transmitters (e.g., transmitters 230a-c of FIG. 2) of the station 110. For example, a receiver may be enabled by enabling one or more components of the receiver (e.g., LNA 235a-c of FIG. 2, etc.), and a transmitter may be enabled by enabling one or more components of the transmitter (e.g., PA 240a-c of FIG. 2, etc.). The updated number of enabled WLAN chains may be communicated to an associated access point (e.g., access device 105 of FIG. 1).

At 335, a determination may be made whether a change in a requested or received WLAN service has occurred. The determination whether a change in requested or received WLAN service has occurred may be made, for example, by the WLAN SoC 220 or other component or module of the station 110. In embodiments, a change in WLAN service may occur when a request for a new WLAN service or task is requested by or received at the station 110. If the determination is made that a change in the WLAN service has occurred, the process 300 may return to 320 where a determination may be made whether the currently provided bitrate meets QoS requirements of the WLAN service. Prior to determining whether the currently provided bitrate meets the QoS requirements of the WLAN service, the station 110 may retrieve or determine updated minimal QoS requirements based upon the new or modified WLAN service.

If, at 335, the determination is made that a change in a requested or received WLAN service has not occurred, the process 300 may proceed to 340. At 340, a determination may be made whether minimal QoS requirements for the WLAN service have changed. The determination whether a change in minimal QoS requirements for the WLAN service has occurred may be made, for example, by the WLAN SoC 220 or other component or module of the station 110. In embodiments, minimal QoS requirements may be based upon requirements for maintaining a certain level of quality for tasks carried out by, or for services requested by the station 110, and QoS requirements may be determined and monitored by the QoS monitor 215 of FIG. 2.

If, at 340, the determination is made that no change in the minimal QoS requirements for the WLAN service has occurred, the process 300 may return to 335 where the determination may be made whether a change in a requested or received WLAN service has occurred.

If, at 340, the determination is made that a change in the minimal QoS requirements for the WLAN service has occurred, the process 300 may return to 320 where a determination may be made whether the currently provided bitrate meets the new minimal QoS requirements of the WLAN service.

Figure 4:
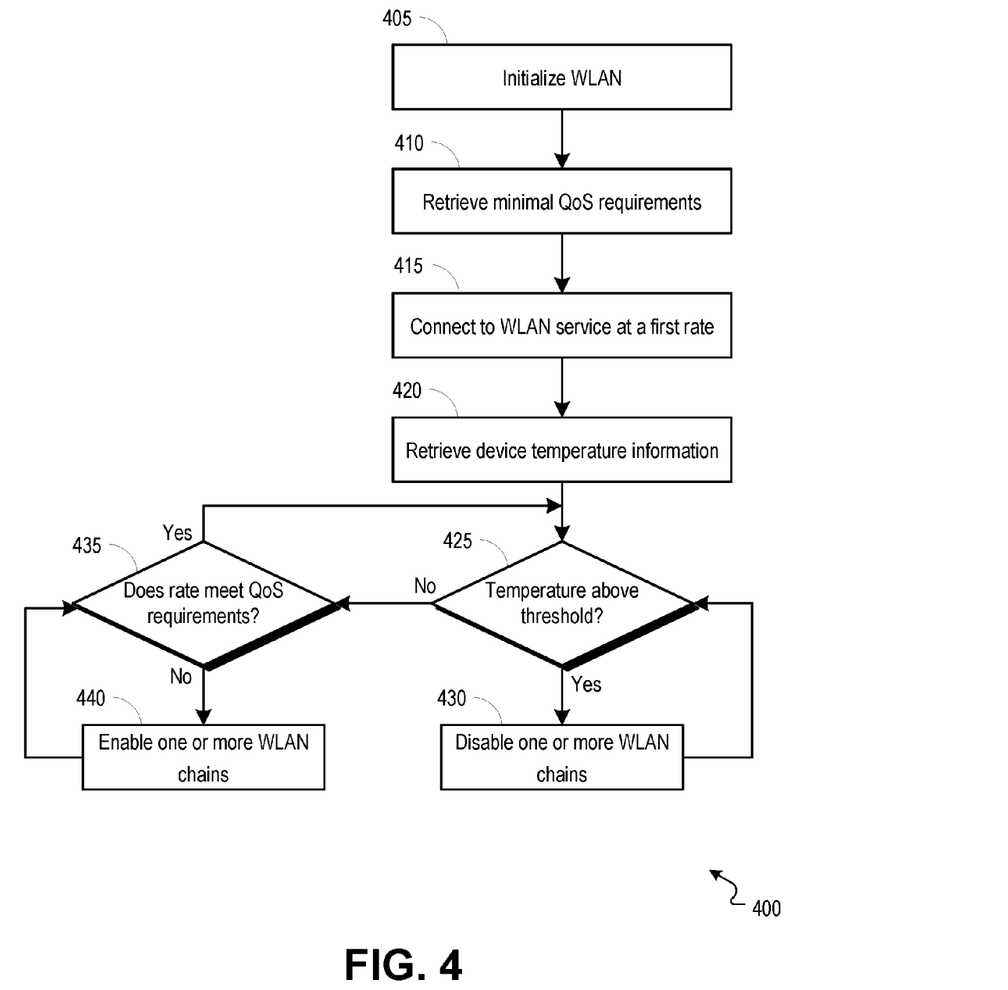
FIG. 4 is a flowchart illustrating an example process operable to determine and utilize a number of WLAN chains based upon a temperature threshold and minimal QoS requirements for a WLAN service.

FIG. 4 is a flowchart illustrating an example process 400 operable to determine and utilize a number of WLAN chains based upon a temperature threshold and minimal QoS requirements for a WLAN service. In embodiments, the process 400 may be carried out by a station 110 of FIG. 1. The process 400 may start at 405, when a WLAN service is initialized at a station 110. A WLAN service may be initialized at a station 110 when a wireless stream is requested by or received at the station 110. For example, a WLAN service may be initialized by a WLAN SoC 220 of FIG. 2.

At 410, minimal QoS requirements for the WLAN service may be retrieved. Minimal QoS requirements for the WLAN service may be retrieved or determined, for example, by the QoS monitor 215 of FIG. 2. In embodiments, the minimal QoS requirements may include minimal QoS metrics needed for supporting the WLAN service, or the minimal QoS requirements may include a minimal bitrate needed for supporting the WLAN service or a determined bitrate having a certain margin above a minimal bitrate needed for supporting the WLAN service.

At 415, the WLAN service may be supported at a first bitrate. The WLAN service may be supported, for example, by the WLAN SoC 220 and one or more WLAN chains. Each of the one or more WLAN chains may include a receiver (e.g., receivers 225a-c) and/or transmitter (e.g., transmitters 230a-c). In embodiments, each WLAN chain enabled at the station 110 may provide a certain bitrate for supporting one or more WLAN services. The first bitrate may be based upon the number of WLAN chains enabled at the station 110. For example, based upon a default setting or the minimal QoS requirements for the WLAN service, the station 110 may enable a certain number of one or more WLAN chains to support the WLAN service.

At 420, device temperature information may be retrieved. Device temperature information may be retrieved, for example, by a power consumption module 210 of FIG. 2. In embodiments, a power consumption module 210 may monitor the internal temperature of the station 110. For example, the power consumption module 210 may monitor the internal temperature of the station 110 by way of monitoring chip temperatures, the internal ambient temperature of the station 110, or by measuring the temperature of other regions or components of the station 110. It should be understood that the internal temperature of the station 110 may be monitored by a device that is external to the station 110.

At 425, a determination may be made whether the internal temperature of the station 110 is above a temperature threshold. The determination whether the internal temperature of the station 110 is above a temperature threshold may be made, for example, by a power consumption module 210 of FIG. 2. In embodiments, the station 110 may be configured with a predetermined or dynamic temperature threshold. For example, the temperature threshold may change with changes in the bitrate or minimal QoS requirements associated with tasks carried out by, or services received by the station 110. The power consumption module 210 may continuously, periodically, or conditionally compare the monitored internal temperature of the station 110 to the temperature threshold.

If, at 425, the determination is made that the internal temperature of the station 110 is above the temperature threshold, the process 400 may proceed to 430. At 430, one or more WLAN chains may be disabled. One or more WLAN chains may be disabled, for example, by the WLAN chain management module 205 of FIG. 2 through the WLAN SoC 220 of FIG. 2. In embodiments, the WLAN chain management module 205 may disable a single WLAN chain or multiple WLAN chains of the station 110. For example, the WLAN chain management module 205 may determine a number of WLAN chains to be disabled based upon a difference between the current internal temperature of the station 110 and the temperature threshold. One or more WLAN chains may be disabled, for example, by disabling one or more receivers (e.g., receivers 225a-c of FIG. 2) and/or transmitters (e.g., transmitters 230a-c of FIG. 2) of the station 110. For example, a receiver may be disabled by disabling one or more components of the receiver (e.g., LNA 235a-c of FIG. 2, etc.), and a transmitter may be disabled by disabling one or more components of the transmitter (e.g., PA 240a-c of FIG. 2, etc.). Disabling one or more WLAN chains may reduce power consumption of the station 110, thereby reducing the internal temperature of the station 110. The updated number of enabled WLAN chains may be communicated to an associated access point (e.g., access device 105 of FIG. 1). After disabling the one or more WLAN chains, the process 400 may return to 425 where the determination may be made whether the internal temperature of the station 110 is above a temperature threshold. Prior to returning to 425, the station 110 may retrieve updated device temperature information for the station 110 (e.g., an updated measurement of the internal temperature of the station 110).

If, at 425, the determination is made that the internal temperature of the station 110 is not above the temperature threshold, the process 400 may proceed to 435. At 435, a determination may be made whether the bitrate supported by the station 110 (e.g., the first bitrate or bitrate subsequently adjusted by disabling or enabling one or more WLAN chains) meets the minimal QoS requirements for the WLAN service. The determination whether the bitrate supported by the station 110 meets the minimal QoS requirements may be made, for example, by the QoS monitor 215 of FIG. 2 or other component or module of the station 110. The supported bitrate may be based upon the number of enabled WLAN chains at the station 110, and the supported bitrate may be compared to the minimal QoS requirements for the WLAN service. In embodiments, other QoS metrics supported by the current bitrate may be determined (e.g., by the QoS monitor 215), and the QoS metrics may be compared to the minimal QoS requirements to determine whether the minimal QoS requirements are met by the current bitrate supported by the station 110.

If, at 435, the determination is made that the bitrate supported by the station 110 does not meet the minimal QoS requirements for the WLAN service, the process 400 may proceed to 440. At 440, one or more WLAN chains may be enabled. One or more WLAN chains may be enabled, for example, by the WLAN chain management module 205 of FIG. 2 through the WLAN SoC 220 of FIG. 2. In embodiments, the WLAN chain management module 205 may enable a single WLAN chain or multiple WLAN chains of the station 110. For example, the WLAN chain management module 205 may determine a number of WLAN chains to be enabled based upon a difference between the QoS or bitrate currently supported by the station 110 and the minimal QoS requirements needed by the WLAN service. One or more WLAN chains may be enabled, for example, by enabling one or more receivers (e.g., receivers 225a-c of FIG. 2) and/or transmitters (e.g., transmitters 230a-c of FIG. 2) of the station 110. For example, a receiver may be enabled by enabling one or more components of the receiver (e.g., LNA 235a-c of FIG. 2, etc.), and a transmitter may be enabled by enabling one or more components of the transmitter (e.g., PA 240a-c of FIG. 2, etc.). The updated number of enabled WLAN chains may be communicated to an associated access point (e.g., access device 105 of FIG. 1). After enabling one or more WLAN chains, the process 400 may return to 435 where a determination may be made whether the bitrate supported by the station 110 meets the minimal QoS requirements for the WLAN service.

If, at 435, the determination is made that the bitrate supported by the station 110 does meet the minimal QoS requirements for the WLAN service, the process 400 may return to 425 where a determination may be made whether the internal temperature of the station 110 is above a temperature threshold. Prior to returning to 425, the station 110 may retrieve updated device temperature information for the station 110 (e.g., an updated measurement of the internal temperature of the station 110).

Figure 5:
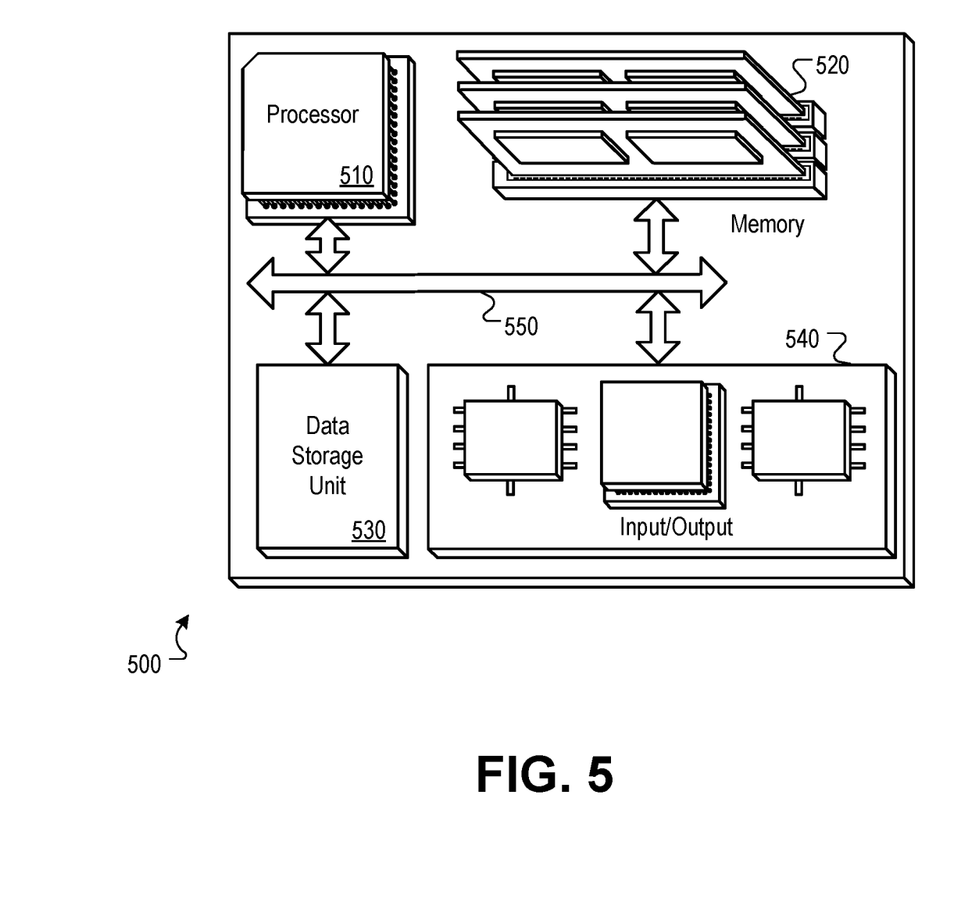
FIG. 5 is a block diagram of a hardware configuration operable to facilitate power consumption management of a station by enabling and disabling wireless chains.

FIG. 5 is a block diagram of a hardware configuration 500 operable to facilitate power consumption management of a station by enabling and disabling wireless chains. It should be understood that the hardware configuration 500 can exist in various types of devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 120 of FIG. 1, WAN 115 of FIG. 1, local network, etc.) and/or one or more access devices (e.g., access devices 105 of FIG. 1) and/or stations (e.g., stations 110 of FIG. 1). It should be understood that the communications protocols described herein are only examples and that various other inter-chip communication protocols may be used to support the methods, systems, and computer readable media described herein.

Those skilled in the art will appreciate that the invention improves upon methods and systems for managing power consumption at a device. Methods, systems, and computer readable media can be operable to facilitate power consumption management of a station by enabling and disabling wireless chains. A station may determine minimal QoS requirements for supporting a WLAN service at the station. The station may determine and utilize a minimal number of WLAN chains needed to support the WLAN service while meeting the minimal QoS requirements. In embodiments, an internal temperature of the station may be monitored, and when the internal temperature of the station exceeds a temperature threshold, one or more WLAN chains of the station may be disabled to reduce power consumption by the station.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    initializing a wireless service at a station, wherein a plurality of wireless chains are enabled at the station for supporting the wireless service;
    determining one or more requirements for supporting the wireless service;
    determining an internal temperature of the station;
    comparing the internal temperature of the station to a temperature threshold; and
    if the internal temperature of the station is greater than the temperature threshold, disabling one or more of the plurality of wireless chains such that, following the determination that the internal temperature of the station is greater than the temperature threshold, a reduced number of wireless chains are enabled at the station for supporting the wireless service than a number of wireless chains that were enabled at the station prior to the determination that the internal temperature of the station is greater than the temperature threshold.

2. The method of claim 1, further comprising:
    determining whether the one or more requirements for supporting the wireless service are met by the reduced number of wireless chains enabled at the station; and
    if the one or more requirements for supporting the wireless service are not met by the reduced number of wireless chains enabled at the station, enabling one or more disabled wireless chains at the station.

3. The method of claim 2, wherein the one or more requirements for supporting the wireless service comprise a bitrate having a certain margin over a bitrate required for supporting the wireless service.

4. The method of claim 2, wherein the one or more requirements for supporting the wireless service comprise one or more quality of service requirements.

5. The method of claim 1, wherein each respective one of the plurality of wireless chains comprises an antenna.

6. The method of claim 1, wherein each respective one of the plurality of wireless chains comprises a receiver and a transmitter.

7. The method of claim 1, wherein the number of disabled wireless chains is determined based upon a difference between the internal temperature of the station and the temperature threshold.

8. A device comprising:
    a plurality of wireless chains, wherein one or more of the plurality of wireless chains are enabled to support a wireless service; and
    one or more modules configured to:
    determine one or more requirements for supporting the wireless service;
    determine an internal temperature of the station;
    compare the internal temperature of the station to a temperature threshold; and
    if the internal temperature of the station is greater than the temperature threshold, disable one or more of the plurality of wireless chains such that, following the determination that the internal temperature of the station is greater than the temperature threshold, a reduced number of wireless chains are enabled for supporting the wireless service than a number of wireless chains that were enabled at the station prior to the determination that the internal temperature of the station is greater than the temperature threshold.

9. The device of claim 8, wherein the one or more modules are further configured to:
    determine whether the one or more requirements for supporting the wireless service are met by the reduced number of enabled wireless chains; and
    if the one or more requirements for supporting the wireless service are not met by the reduced number of enabled wireless chains, enable one or more of the plurality of disabled wireless chains.

10. The device of claim 9, wherein the one or more requirements for supporting the wireless service comprise a bitrate having a certain margin over a bitrate required for supporting the wireless service.

11. The device of claim 9, wherein the one or more requirements for supporting the wireless service comprise one or more quality of service requirements.

12. The device of claim 8, wherein each respective one of the plurality of wireless chains comprises an antenna.

13. The device of claim 8, wherein each respective one of the plurality of wireless chains comprises a receiver and a transmitter.

14. One or more non-transitory computer readable media having instructions operable to cause one or more processors to perform the operations comprising:
- initializing a wireless service at a station, wherein a plurality of wireless chains are enabled at the station for supporting the wireless service;
- determining one or more requirements for supporting the wireless service;
- determining an internal temperature of the station;
- comparing the internal temperature of the station to a temperature threshold; and
- if the internal temperature of the station is greater than the temperature threshold, disabling one or more of the plurality of wireless chains such that, following the determination that the internal temperature of the station is greater than the temperature threshold, a reduced number of wireless chains are enabled at the station for supporting the wireless service than a number of wireless chains that were enabled at the station prior to the determination that the internal temperature of the station is greater than the temperature threshold.

15. The one or more non-transitory computer-readable media of claim 14, wherein the instructions are further operable to cause the one or more processors to perform the operations comprising:
- determining whether the one or more requirements for supporting the wireless service are met by the reduced number of wireless chains enabled at the station; and
- if the one or more requirements for supporting the wireless service are not met by the reduced number of wireless chains enabled at the station, enabling one or more disabled wireless chains at the station.

16. The one or more non-transitory computer-readable media of claim 15, wherein the one or more requirements for supporting the wireless service comprise a bitrate having a sufficient margin over a minimal bitrate required for supporting the wireless service.

17. The one or more non-transitory computer-readable media of claim 15, wherein the one or more requirements for supporting the wireless service comprise one or more quality of service requirements.

18. The one or more non-transitory computer-readable media of claim 14, wherein each respective one of the plurality of wireless chains comprises an antenna.

19. The one or more non-transitory computer-readable media of claim 14, wherein each respective one of the plurality of wireless chains comprises a receiver and a transmitter.

20. The one or more non-transitory computer-readable media of claim 14, wherein the number of disabled wireless chains is determined based upon a difference between the internal temperature of the station and the temperature threshold.

* * * * *